United States Patent
Takechi et al.

(10) Patent No.: US 11,696,056 B2
(45) Date of Patent: Jul. 4, 2023

(54) OPTICAL TRANSMISSION SYSTEM AND OPTICAL TRANSMISSION METHOD

(71) Applicant: Nippon Telegraph and Telephone Corporation, Tokyo (JP)

(72) Inventors: Hiroto Takechi, Musashino (JP); Katsuhiro Araya, Musashino (JP); Masatoshi Namiki, Musashino (JP); Hiroki Kawahara, Musashino (JP); Takeshi Seki, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 43 days.

(21) Appl. No.: 17/433,120

(22) PCT Filed: Feb. 13, 2020

(86) PCT No.: PCT/JP2020/005650
§ 371 (c)(1),
(2) Date: Aug. 23, 2021

(87) PCT Pub. No.: WO2020/175164
PCT Pub. Date: Sep. 3, 2020

(65) Prior Publication Data
US 2022/0046341 A1    Feb. 10, 2022

(30) Foreign Application Priority Data

Feb. 26, 2019  (JP) .................. 2019-033359

(51) Int. Cl.
*H04J 14/02*    (2006.01)
*H04B 10/079*  (2013.01)
*H04Q 11/00*   (2006.01)

(52) U.S. Cl.
CPC ....... *H04Q 11/0005* (2013.01); *H04B 10/079* (2013.01)

(58) Field of Classification Search
CPC .................. H04J 14/0201; H04B 10/079
See application file for complete search history.

(56) References Cited

U.S. PATENT DOCUMENTS

2015/0295674 A1\* 10/2015 Inoue .................. H04J 14/0215
                                                               398/83
2017/0047990 A1\*  2/2017 Kawaguchi ........ H04B 10/0775
2019/0081723 A1\*  3/2019 Boduch ............... H04J 14/0216

FOREIGN PATENT DOCUMENTS

JP         2012015966         1/2012

OTHER PUBLICATIONS

[No Author Listed], "Interfaces for the optical transport network," Recommendation ITU-T G.709/Y.1331, Jun. 2016, 244 pages.

(Continued)

*Primary Examiner* — Shi K Li
(74) *Attorney, Agent, or Firm* — Fish & Richardson P.C.

(57) ABSTRACT

[Problem] whether optical input interruption detected by an OXC device is due to an external failure from an upstream side or an internal failure of the OXC device in a transponder device connected to the OXC device using an optical transmission line, and this determination is implemented at low cost.
[Solution] An optical transmission system (10A) is configured by connecting a plurality of OXC devices (14A) using optical fibers (16) between transponder devices (15A1) that relay optical signals transmitted to/from terminals (19a, 19b). The OXC device (14A) includes an OSC part (4d1) and a monitoring control part (4e1). The OSC part (4d1) outputs wavelength information on an optical signal in which optical input interruption has occurred and path information on a path of an optical fiber (16) in which the optical input interruption has occurred, at the time of detecting the optical input interruption from the optical fiber (16). In accordance with the wavelength information and the path (Continued)

information that have been output as above, the OXC device (14A) includes an AIS generation part (4*j*) that generates an AIS signal including both pieces of information on the wavelength and the path of the optical signal relating to the optical input interruption and alarm information relating to both the pieces of information.

4 Claims, 9 Drawing Sheets

(56) References Cited

OTHER PUBLICATIONS

[No Authro Listed], "Open ROADM," openroadm.org Multi-Source Agreement, retrieved on Jan. 29, 2019, retrieved from <https://0201.nccdn.net/4_2/000/000/05e/0e7/Open-ROADM-whitepaper-v2_2.pdf>, 2 pages.

* cited by examiner

| CHANNEL NUMBER | PATH NUMBER | ACCOMMODATION WAVELENGTH | DESTINATION DEVICE ID | TRANSPONDER ID |
|---|---|---|---|---|
| 1 | 01 | $\lambda 1$ | TP1 | Ta1 |
|   |    | $\lambda 2$ |     | Ta2 |
|   | 02 | $\lambda 1$ |     | Tj1 |
| n | 01 | $\lambda m$ | TPn | Tn1 |
|   |    | $\lambda n$ |     | Tn2 |

Fig. 2

| PACKET HEADER |
|---|
| TRANSMITTING DEVICE ID |
| DESTINATION DEVICE ID |
| TRANSPONDER ID |
| WAVELENGTH NUMBER |
| ⋮ |

Fig. 7

OPTICAL TRANSMISSION SYSTEM AND OPTICAL TRANSMISSION METHOD

CROSS-REFERENCE TO RELATED APPLICATIONS

This application is a National Stage application under 35 U.S.C. § 371 of International Application No. PCT/JP2020/005650, having an International Filing Date of Feb. 13, 2020, which claims priority to Japanese Application Serial No. 2019-033359, filed on Feb. 26, 2019. The disclosure of the prior application is considered part of the disclosure of this application, and is incorporated in its entirety into this application.

TECHNICAL FIELD

The present invention relates to an optical transmission system and an optical transmission method having a disaggregated configuration. In the disaggregated configuration, transponder devices and optical cross connect (OXC) devices are connected using an optical fiber cable and aggregated.

BACKGROUND ART

FIG. 8 illustrates a block diagram of a conventional optical transmission system 10. In the optical transmission system 10, a plurality of OXC devices 12, 13, and 14 are connected using optical fiber cables (also referred to as "optical fibers") 16 between a transponder device 11 and a transponder device 15 that are distant from each other (hereinafter referred to as "transponder devices 11 and 15"). In addition, an element management system (EMS) device 17 is cable-connected to the transponder devices 11 and 15 using optical fibers, conductive cables, and the like. An EMS device 18 is cable-connected to the OXC devices 12 to 14. Terminals 19 and 20 as communication devices such as personal computers, routers, or the like are respectively connected to the transponder devices 11 and 15.

This optical transmission system 10 shows an aspect in which the transponder devices 11 and 15 have a same configuration, the OXC devices 12 to 14 also have a same configuration, and a signal is transmitted from the terminal 19 to the terminal 20. For this reason, a multiplexer (MUX) 12c that multiplexes optical signals having a plurality of wavelengths is provided in the OXC device 12 disposed on a transmission side, and a demultiplexer (DMUX) 14c that demultiplexes optical signals having a plurality of wavelengths is provided in the OXC device 14 disposed on a reception side.

Note that the OXC device 13 connected between the OXC device 12 and the OXC device 14 that are placed on both sides of the OXC device 13 relays optical signals transmitted between the OXC device 12 and the OXC device 14 on both sides.

The transponder devices 11 and 15 relay optical signals transmitted between the terminal 19 and the terminal 20. The OXC devices 12 to 14 switch multi-way wavelength paths using optical fibers 16. The EMS device 17 monitors and controls processes for relaying communication in the transponder devices 11 and 15, and the EMS device 18 monitors and controls processes for switching multi-way wavelength paths in the OXC devices 12 to 14.

FIG. 9 illustrates, as a representative example, the OXC device 14 and the transponder device 15 connected to the OXC device 14. The OXC device 14 includes an optical amplifier 4a, an optical switch (SW) 4b, a DMUX 4c, an optical supervisory channel (OSC) part 4d, a monitoring control part 4e, an alarm indication signal (AIS) generation part 4f, and a communication processing part 4g. The EMS device 18 is connected to the monitoring control part 4e, and the EMS device 18 receives monitoring information from the monitoring control part 4e.

The transponder device 15 includes a plurality of (one or more) transponders 5a1 and 5a2, a communication processing part 5g, an AIS receiving part 5h, and a monitoring control part 5e. The communication processing part 5g of the transponder device 15 and the communication processing part 4g of the OXC device 14 are cable-connected using LAN cables or the like. The EMS device 17 is connected to the monitoring control part 5e, and the EMS device 17 receives the monitoring information from the monitoring control part 5e. Note that both the AIS receiving part 5h and the monitoring control part 5e constitute a second control part described in the claims.

In such a configuration, when optical signals of wavelengths $\lambda 1$ to $\lambda n$ that have been transmitted through the optical fiber 16 are input to the OXC device 14, the optical signals are amplified by the optical amplifier 4a and are input to the DMUX 4c through the optical SW 4b. The DMUX 4c demultiplexes the optical signals of the wavelengths $\lambda 1$ to $\lambda n$ and transmits the optical signals of the wavelengths $\lambda 1$ and $\lambda 2$ to the transponder device 15 through the optical fiber 16.

In the transponder device 15, one transponder 5a1 relays an optical signal of the wavelength $\lambda 1$ to transmit to the terminal 20a1, and the other transponder 5a2 relays an optical signal of the wavelength $\lambda 2$ to transmit to the terminal 20a2. Information relating to the relay processes of the transponders 5a1 and 5a2 is notified to the monitoring control part 5e and detected.

The OSC part 4d of the OXC device 14 monitors an alarm signal from an upstream device of the optical fiber 16. When the alarm signal indicating a failure of the upstream device is detected, the OSC part 4d outputs the alarm signal to the monitoring control part 4e. In addition, also when optical input interruption due to a fault of the optical fiber 16 is detected by the optical amplifier 4a, information about the optical input interruption is output to the monitoring control part 4e.

When the optical input interruption information is detected, the monitoring control part 4e outputs fault information to the AIS generation part 4f. The AIS generation part 4f generates an AIS signal (alarm display signal) in accordance with input fault information and transmits this AIS signal to the communication processing part 5g of the transponder device 15 through the communication processing part 4g. This transmitted AIS signal is received by the AIS receiving part 5h and is notified to the monitoring control part 5e. The monitoring control part 5e detects that optical input interruption has occurred in the OXC device 14 in accordance with detection of the AIS signal.

As such optical transmission system, Patent Literature 1 discloses a method for enhancing a fault section rating for a fault of a wavelength multiplexing section in an optical multiplexing network. Further, Non Patent Literature 1 describes a device capable of reducing a device cost and reducing power consumption by causing a wavelength multiplexing device not to perform electrical termination processing, and the device exchanges an alarm in an optical wavelength multiplexing section using an OSC separately from a main signal. Furthermore, Non Patent Literature 2 describes a configuration of an optical multiplexing transmission system in which a transponder part and a wavelength multiplexing part are configured in separate systems such as an open reconfigurable optical add/drop multiplexer (ROADM) or an open line system.

CITATION LIST

Patent Literature

Patent Literature 1: JP 2012-015966 A

Non Patent Literature

NPTL 1: ITU-T G.709, [online], 2016, [Searched on Jan. 29, 2019], the Internet: <URL: https://www.itu.int/rec/T-REC-G.709/en>
NPTL 2: Open ROADM, "openroadm.org Multi-Source Agreement", [online], 2019, [Searched on Jan. 29, 2019], the Internet: <URL: https://0201.nccdn.net/4_2/000/000/05e/0e7/Open-ROADM-whitepaper-v2_2.pdf>

SUMMARY OF THE INVENTION

Technical Problem

Meanwhile, in the optical transmission system 10 described above, as illustrated in FIG. 8, for example, it is assumed that a failure 21 has occurred in the optical fiber 16 between the OXC device 12 and the OXC device 13. In this case, in the OXC device 13 disposed on a downstream side of the failure 21, optical input interruption is detected as denoted by a circle 21a, and an AIS signal is generated as denoted by a white circle 21b. Failure position information indicating the occurrence of the failure 21 in the optical fiber 16 between the OXC devices 12 and 13 is superimposed on this AIS signal. The AIS signal is detected by the OXC device 14 disposed further downstream as denoted by a circle 21c. This detected AIS signal cannot be detected by the transponder device 15.

In the transponder device 15, an optical signal related to the failure 21 is in an interruption state, and thus optical input interruption is detected by the transponders 5a1 and 5a2 as denoted by a circle 21d. In other words, optical input interruption due to an external failure occurred on an upstream side can be detected by the transponders 5a1 and 5a2.

However, the transponders 5a1 and 5a2 have optical input interruption due to a failure on an upstream side of the OXC device 14 in addition to optical input interruption due to failures occurring in a section from the transponder device 15 to the OXC device 14, and there is a problem in that it is difficult to determine which of the above two factors has caused the optical input interruption.

If the determination cannot be made as described above, a maintenance operator of the transponder device 15 cannot quickly determine whether a failure is self-responsibility (responsibility of own device) or the other responsibility (responsibility of other devices), and unnecessary maintenance work and the like may be performed.

This type of problem also occurs in case of Patent Literature 1 and Non Patent Literatures 1 and 2. In the technology disclosed in Patent Literature 1, information, in other words, fault information from an optical node device (corresponding to a MUX) to an optical path termination device is not notified. In the technology described in Non Patent Literature 1, no OSC part is provided between a wavelength multiplexing part of an endpoint device and a transponder part, and no alarm transmission is performed. In the technology described in Non Patent Literature 2, an EMS that operates a communication device is separately provided in a wavelength multiplexing part and a transponder part, and it is necessary to acquire information about both an EMS for the transponder part and an EMS for the wavelength multiplexing part so as to acquire a state of an optical transmission network. In this configuration, an alarm transmitting/receiving means is not provided between the transponder part and the wavelength multiplexing part, and thus, a maintenance operator of the transponder cannot quickly determine whether an optical channel failure detected by the transponder part is due to self-responsibility or another responsibility.

FIG. 9 illustrates a configuration in which one transponder device 15 is connected to one OXC device 14 in the optical transmission system 10. However, practically, a plurality of transponder devices 15 is connected in parallel with one OXC device 14. In this case, in order to transmit an AIS signal generated by the OXC device 14 to each of the transponder devices 15, the same number of LAN cables as that of the transponder devices 15 is necessary, and there is a problem that the facility costs increase as the number of transponder devices 15 increases.

The present invention has been made in view of such circumstances, and an objective thereof is to provide an optical transmission system and an optical transmission method capable of appropriately determining whether optical input interruption detected by an OXC device is due to an external failure from an upstream side or due to an internal failure of the OXC device in a transponder device connected to the OXC device using an optical transmission line and implementing this determination at low cost.

Means for Solving the Problem

As a means for solving the problem described above, the disclosure according to a first aspect is an optical transmission system. The optical transmission system connects, using an optical transmission path, and aggregates a plurality of optical cross connect (OXC) devices that switches wavelength paths of optical signals between transponder devices that relays optical signals transmitted to and from a communication device. The OXC device includes: a first control part, when optical input interruption in which an optical signal input from the optical transmission line is interrupted is detected, configured to output wavelength information indicating a wavelength of the optical signal in which the optical input interruption has occurred, and path information on a path of the optical transmission line in which the optical input interruption has occurred; and a generation part configured to generate an alarm signal in accordance with the wavelength information and the path information output from the first control part, the alarm signal including both pieces of information on the wavelength and the path of the optical signal relating to the optical input interruption and alarm information relating to the both pieces of information. The transponder device includes a second control part configured to notify of an external failure of the transponder device based on the both pieces of information and the alarm information included in the generated alarm signal.

In the disclosure according to a fourth aspect, an optical transmission method of an optical transmission system that connects, using an optical transmission line, and aggregates a plurality of optical cross connect (OXC) devices that switches wavelength paths of optical signals between transponder devices that relays optical signals transmitted to and from a communication device, the optical transmission method including: in the OXC device, when the optical input interruption in which an optical signal input from the optical transmission line is unconnected is detected, outputting wavelength information indicating a wavelength of the optical signal in which optical input interruption has occurred and path information on a path of the optical transmission line in which the optical input interruption has occurred, and generating an alarm signal in accordance with the output wavelength information and the output path information, the alarm signal including both pieces of information on the wavelength and the path of the optical signal relating to the optical input interruption and alarm information relating to the both pieces of information; and in the transponder device, notifying of an external failure of the transponder device based on the both pieces of information and the alarm information included in the generated alarm signal.

According to the configuration of the first aspect and the method of the fourth aspect, in the OXC device, an alarm signal is generated. The alarm signal includes both pieces of information on a wavelength of an optical signal relating to optical input interruption from an optical transmission line and information on a path of the optical transmission line in which the optical signal is transmitted and alarm information relating to the both pieces of information, and this alarm signal is notified from the OXC device to the transponder device. The transponder device can detect an external failure of the transponder device based on the both pieces of information and alarm information included in the notified alarm signal. For this reason, in the transponder device connected to the OXC device using an optical transmission line, it is possible to appropriately determine whether the optical input interruption detected by the OXC device is due to an external failure on an upstream side or an internal failure of the OXC device.

In the disclosure according to a second aspect, in the optical transmission system according to the first aspect, an optical coupler is inserted into an optical transmission line coupling the OXC device and the transponder device, and the alarm signal generated by the generation part is transmitted from the OXC device to the transponder device through the optical coupler.

According to this configuration, an alarm signal can be transmitted to the transponder device using an existing optical transmission line coupling the OXC device and the transponder device through the optical coupler. For this reason, a high-cost configuration is not necessary, in which an alarm signal is transmitted by cable-connecting an OXC device and a transponder device using a LAN cable or the like other than an optical transmission line as in a conventional configuration. In other words, a configuration in which the transponder device can appropriately determine whether optical input interruption of the OXC device is due to an external failure or an internal failure can be realized at low cost.

In a disclosure according to a third aspect, in the optical transmission system according to the first or second aspect, the transponder device includes a first database (DB) storing information on a path number that is a number of a path of the optical transmission line, information on an accommodation wavelength that is a wavelength of an optical signal accommodated in the path, information on device identifications (IDs) that are unique information on a transmitting device and a destination device of the signal, and information on a transponder ID. The OXC device includes a second DB in which each piece of the information stored in the first DB is registered and stored. The transponder device determines recovery from the optical input interruption when a state is changed from a state of being unconnected to the OXC device to a state of being connected through the optical transmission line and, after this determination, the transponder device superimposes each piece of the information read from the first DB on a control signal that has been changed to a unique specific wavelength, and transmits a resultant control signal to the OXC device, and the OXC device receives the transmitted control signal and registers and stores the information superimposed on the received control signal in the second DB in accordance with control of the second control part.

According to this configuration, when the OXC device is connected to the transponder device for the first time, each piece of information on the accommodation wavelength, the device ID, and the transponder ID stored in the first DB of the transponder device can be registered and stored in the second DB of the OXC device. After storing, an occurrence of an external failure relating to optical input interruption of the OXC device can be notified to the transponder device using each piece of information stored in the second DB.

Effects of the Invention

The present disclosure provides an optical transmission system and an optical transmission method capable of appropriately determining, at low cost, whether optical input interruption detected by an OXC device is due to an external failure from an upstream side or an internal failure of the OXC device in a transponder device coupled to the OXC device using an optical transmission line.

BRIEF DESCRIPTION OF DRAWINGS

FIG. 2 is a diagram illustrating an information configuration of a DB included in an accommodation information management part of the OXC device.

FIG. 7 is a diagram illustrating format information on a control signal for pre-registration of information in the DB of the OXC device.

DESCRIPTION OF EMBODIMENTS

Hereinafter, an embodiment of the present invention will be described with reference to the drawings. Here, in all the drawings of the present specification, components having corresponding functions are denoted by the same reference signs and description thereof will be appropriately omitted.

Configuration of Embodiment

Figure 1:
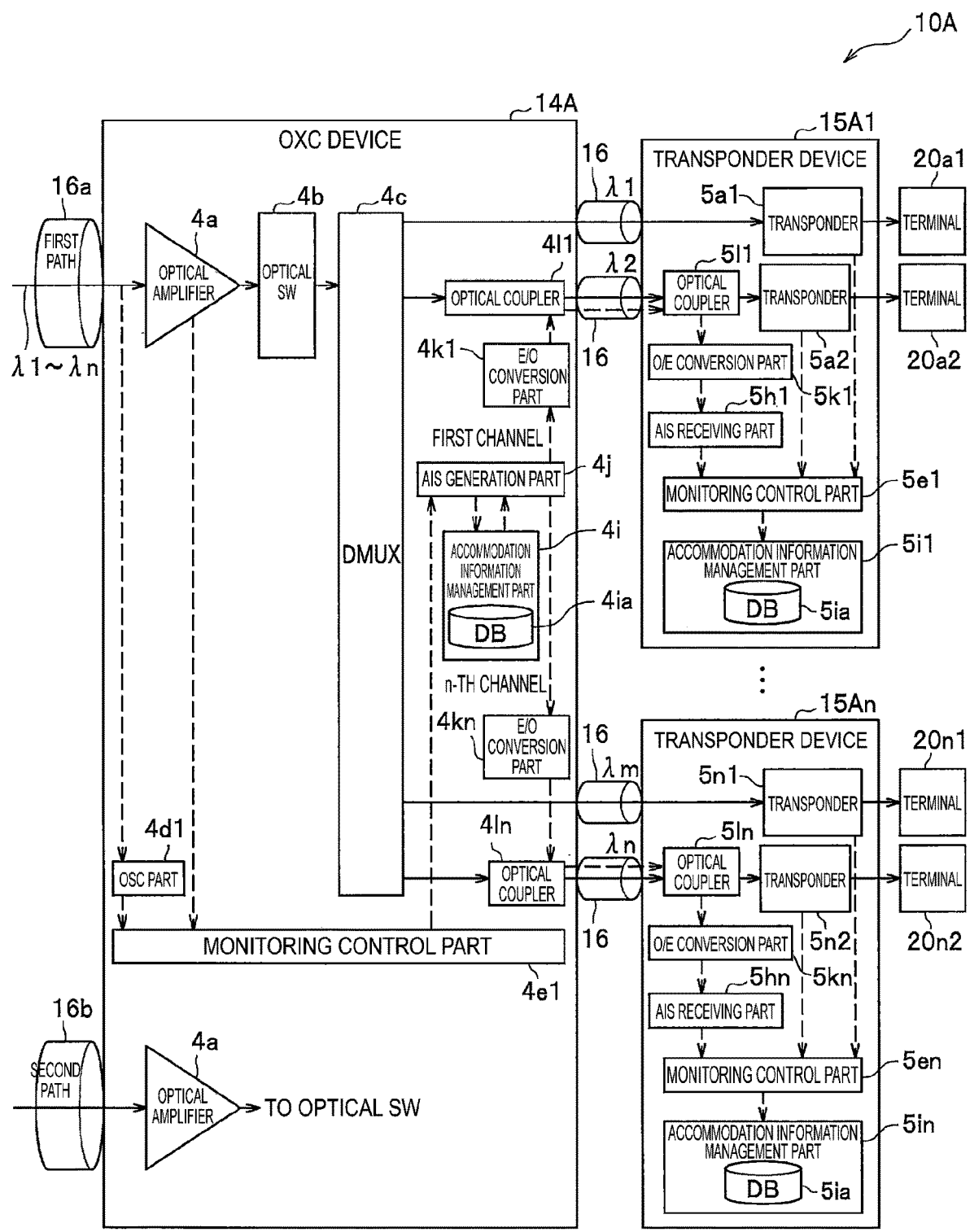
FIG. 1 is a block diagram illustrating a configuration of an OXC device and transponder devices in an optical transmission system according to an embodiment of the present invention.

FIG. 1 is a block diagram illustrating a configuration of an optical transmission system according to an embodiment of the present invention. In an optical transmission system 10A illustrated in FIG. 1, one OXC device 14A and a plurality of transponder devices 15A1 to 15An connected to the OXC device 14A using optical fibers 16 are illustrated.

Figure 8:
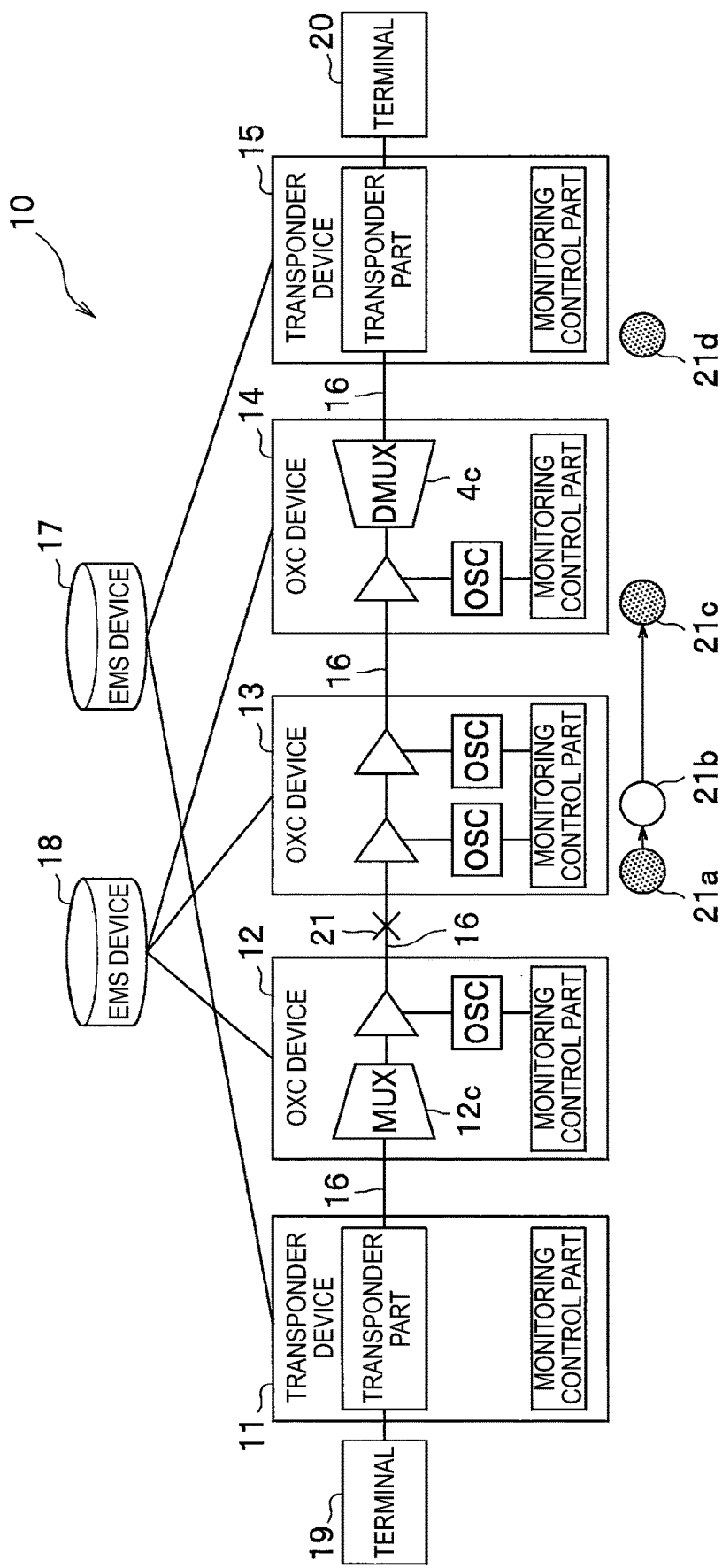
FIG. 8 is a block diagram illustrating a configuration of a conventional optical transmission system.

One OXC device 14A and a plurality of transponder devices 15A1 to 15An respectively correspond to an optical cross connection (OXC) device 14 and a transponder device 15 on a right end side of the optical transmission system 10 illustrated in FIG. 8. Thus, the overall connection configuration of the optical transmission system 10A illustrated in FIG. 1 corresponds to that of the optical transmission system 10.

The OXC device 14A includes an optical amplifier 4a, an optical SW 4b, a DMUX 4c, an optical monitoring channel (OSC) part 4d1, a monitoring control part 4e1, an accommodation information management part 4i, an AIS generation part 4j, electrical/optical (E/O) conversion parts 4k1 and 4kn, and optical couplers 4/1 to 4/n. In addition, a form in which a first path 16a and a second path 16b are connected to the OXC device 14A using the optical fibers 16 is also illustrated. Note that the optical fibers 16 constitute an optical transmission line described in the claims. Both the OSC part 4d and the monitoring control part 4e1 constitute a first control part described in the claims. The AIS generation part 4j constitutes a generation part described in the claims.

The transponder devices 15A1 to 15An have the same configuration. The transponder device 15A1 includes two transponders 5a1 and 5a2, an optical coupler 5/1, an optical/electrical (O/E) conversion part 5k1, an AIS receiving part 5h1, a monitoring control part 5e1, and an accommodation information management part 5i1. A terminal 20a1 is connected to one transponder 5a1, and a terminal 20a2 is connected to the other transponder 5a2.

Similarly, the transponder device 15An includes two transponders 5n1 and 5n2, an optical coupler 5/n, an O/E conversion part 5kn, an AIS receiving part 5hn, a monitoring control part 5en, and an accommodation information management part 5in. A terminal 20n1 is connected to one transponder 5n1, and a terminal 20n2 is connected to the other transponder 5n2.

Here, the optical coupler 4/1 (or the optical coupler 4/n) of the OXC device 14A and the optical coupler 5/1 (or the optical coupler 5/n) of the transponder device 15A1 are connected using an optical fiber 16.

In such a configuration, when optical signals of respective wavelengths λ1 to λn that have been transmitted through the first path 16a are input to the OXC device 14A, the optical signals are amplified by the optical amplifier 4a and are input to the DMUX 4c through the optical SW 4b. The DMUX 4c demultiplexes the optical signals of respective wavelengths λ1 to λn. The optical signals of the wavelengths λ1 and λ2 that have been demultiplexed are transmitted to the transponder device 15A1 through the optical fiber 16. In addition, the optical signals of the wavelengths λm and λn that have been demultiplexed by the DMUX 4c are transmitted to the transponder device 15An through the optical fiber 16. In this way, the wavelengths λ1, λ2, . . . , λm, and λn of the optical signals accommodated in the respective transponder devices 15A1 to 15An are different.

In the transponder device 15A1, one transponder 5a1 transmits an optical signal of the wavelength λ1 to the terminal 20a1 by relaying the optical signal, and the other transponder 5a2 transmits an optical signal of the wavelength λ2 to the terminal 20a2 by relaying the optical signal. Information relating to the relay process of each of the transponders 5a1 and 5a2 is notified to the monitoring control part 5e1 and is detected.

Similarly, in the transponder device 15An, one transponder 5n1 transmits an optical signal of the wavelength λm to the terminal 20n1 by relaying the optical signal and the other transponder 5n2 transmits an optical signal of the wavelength λn to the terminal 20n2 by relaying the optical signal. Information relating to the relay process of each of the transponders 5n1 and 5n2 is notified to the monitoring control part 5e1 and is detected.

Next, a configuration for detecting a failure will be described. In the OXC device 14A, the OSC part 4d1 monitors the optical signals of the wavelengths λ1 to λn that are input into the OXC device 14A from an upstream side of the first path 16a. In this monitoring, when an interruption state (optical input interruption) of an optical signal is detected, the OSC part 4d1 outputs, to the monitoring control part 4e, optical input interruption information including wavelength information on wavelengths (for example, λ1 and λ2) of the optical signal in which optical input interruption has occurred and path information on a path (for example, the first path) of this optical signal. Note that the optical input interruption may be detected by the optical amplifier 4a and may be notified to the monitoring control part 4e1.

When an AIS signal generated due to a failure on an upstream side by the OXC device placed on the upstream side is detected, the OSC part 4d1 outputs this detected AIS signal to the monitoring control part 4e1. In addition, in a case where optical input interruption due to an internal failure of the OXC device 14A is detected, the OSC part 4d1 outputs optical input interruption information to the monitoring control part 4e. The AIS signal notified from outside and the optical input interruption information relating to an internal failure are notified to the transponder devices 15A1 to 15An as they are.

When the optical input interruption information including the information on the wavelengths λ1 and λ2 of the optical signal is input from the OSC part 4d1, the monitoring control part 4e1 outputs the information on the wavelengths λ1 and λ2 of the optical signals in which optical input interruption has occurred and the information on the first path of this optical signal in the optical input interruption information to the AIS generation part 4j.

Here, the accommodation information management part 4i stores and manages information on an optical signal input to the OXC device 14A and accommodation information on each of the transponder devices 15A1 to 15An in a database (DB) 4ia. As illustrated in FIG. 2, each piece of information on a channel number, a path number, an accommodation wavelength, a destination device identification (ID), and a transponder ID are stored in the DB 4ia.

The channel number is a number that is used for distinguishing between the transponder devices 15A1 to 15An, for example, "1" is a number relating to the transponder device 15A1, and "n" (here, n is a natural number other than 1 and 2) is a number relating to the transponder device 15An.

The path number is the number of a path according to the optical fiber 16 on an input side of the OXC device 14A, "01" is the number of the first path 16a (FIG. 1), and "02" is the number of the second path 16b (FIG. 1).

The accommodation wavelength represents the wavelengths of optical signals accommodated in a path, and "λ1"

and "λ2" represent the wavelengths of the optical signals accommodated in the first path 16a. "λm" and "λn" represent the wavelengths of the optical signals accommodated in the first path 16a.

The destination device ID is the ID of one of the transponder devices 15A1 to 15An that is a destination of the AIS signal, "TP1" is the ID of the transponder device 15A1, and "TPn" is the ID of the transponder device 15An.

The transponder ID is a transponder-specific ID in each of the transponder devices 15A1 to 15An, "Ta1" is the ID of transponder 5a1 of the transponder device 15A1, and "Ta2" is the ID of the transponder 5a2 in the transponder device 15A1. "Tj1" is the ID of a transponder in a transponder device not illustrated in the drawing. "Tn1" is the ID of the transponder 5n1 in the transponder device 15An, and "Tn2" is the ID of the transponder 5n2 in the transponder device 15An.

Figure 3:
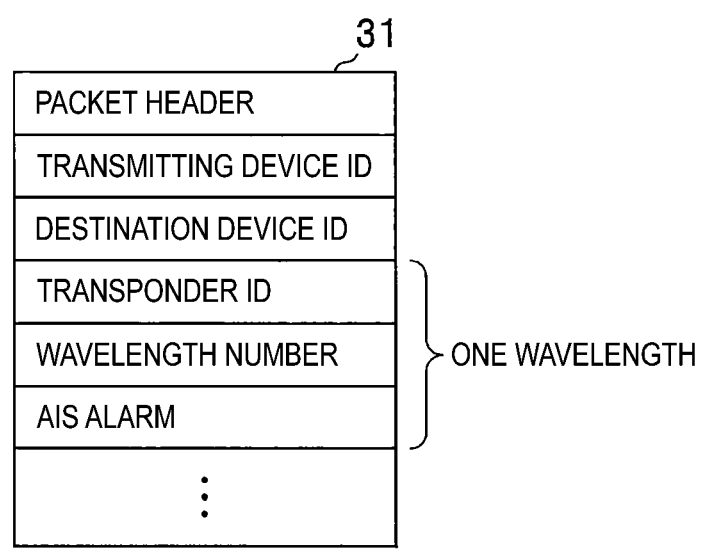
FIG. 3 is a diagram illustrating a configuration of format information on an AIS signal.

When the information of the wavelengths λ1 and λ2 of optical signals and the information on the first path of these optical signals are input from the monitoring control part 4e1, the AIS generation part 4j of the OXC device 14A illustrated in FIG. 1 generates an AIS signal 31 having a format illustrated in FIG. 3 in accordance with the DB 4ia (see FIG. 2) included in the accommodation information management part 4i. The format of the AIS signal 31 is composed of information (format information) of a packet header, a transmitting device ID, a destination device ID, a transponder ID, a wavelength number, an AIS alarm, and the like in order from the top in FIG. 3. Note that both the transmitting device ID and the destination device ID constitute a device ID described in the claims. In addition, the AIS signal 31 constitutes an alarm signal described in the claims.

The packet header is header information used for identifying a start of a packet of the packetized AIS signal 31. The transmitting device ID is an ID of the OXC device 14A as a device that transmits the AIS signal 31. The destination device ID is selected from the destination device IDs (FIG. 3) stored in the DB 4ia and is inserted into the format information.

The transponder ID is selected from the transponder IDs stored in the DB 4ia and is inserted into the format information.

The wavelength number is a number corresponding to a wavelength selected from the wavelength information stored in the DB 4ia.

The AIS alarm is alarm information that notifies of a failure that has occurred in the optical fiber 16 and a failure that has occurred in the OXC device connected to the optical fiber 16.

Here, the information on the destination device ID, the transponder ID, and the wavelength number, which are illustrated in FIG. 3, stored in the DB 4ia is selected in accordance with accommodation wavelengths corresponding to the wavelengths λ1 and λ2 of the optical signals input from the monitoring control part 4e1 to the AIS generation part 4j or the path number corresponding to the first path of the optical signals.

The AIS generation part 4j illustrated in FIG. 1 reads and superimposes each piece of information from the DB 4ia of the accommodation information management part 4i in accordance with the information on the wavelengths λ1 and λ2 of the optical signals from the monitoring control part 4e1 and the information on the first path in which these optical signals are transmitted to generate an AIS signal 31. In this generation, two signals are generated; an AIS signal on which a path number "01" of the first path 16a, an accommodation wavelength "λ1", a destination device ID "TP1", and a transponder ID "Ta1" are superimposed, and an AIS signal on which a path number "01", an accommodation wavelength "λ2", a destination device ID "TP1", and a transponder ID "Ta2" are superimposed.

The two AIS signals are transmitted to a control channel (for example, a first channel) connected to the destination transponder device 15A1. At this time, the two AIS signals are converted from electrical signals to optical signals by the E/O conversion part 4k1 and are input from the optical coupler 4l1 to the optical coupler 5l1 of the transponder device 15A1 through the optical fiber 16.

Figure 9:
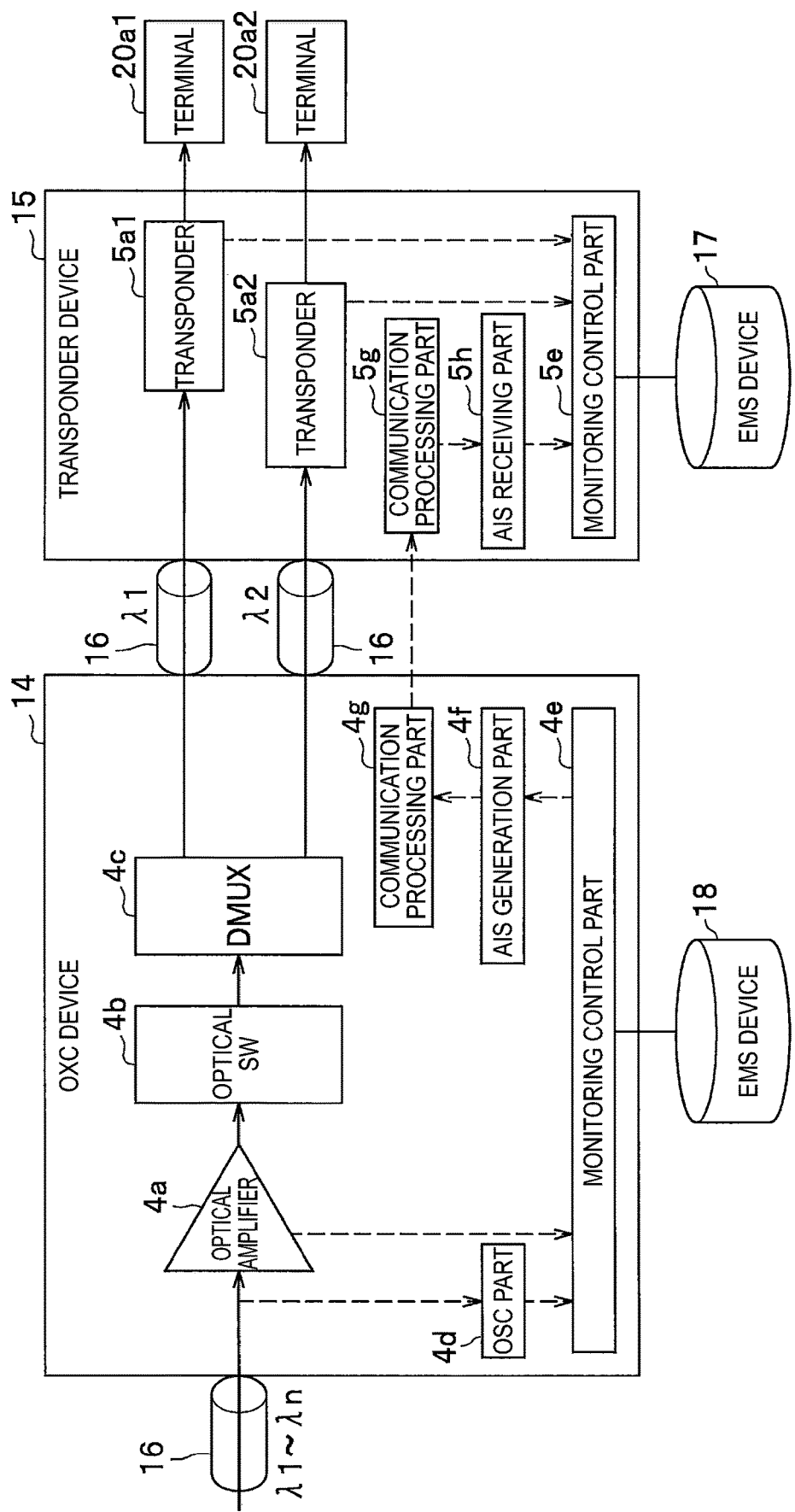
FIG. 9 is a block diagram illustrating a configuration of an OXC device and transponder devices in a conventional optical transmission system.

After the optical signals are converted into electrical signals by the O/E converter 5k1, the two AIS signals input to the optical coupler 5l1 are received by the AIS receiving part 5h1 and are input to the monitoring control part 5e1. The monitoring control part 5e1 notifies a monitoring device such as the EMS device 17 (see FIG. 9) connected to the transponder devices 15A1 to 15An of the occurrence of a failure of the first path 16a according to the two AIS signals and the occurrence of a failure of the optical signals of the wavelengths λ1 and λ2 transmitted to the first path 16a to recognize the failures as external failures.

AIS Signal Transmitting and Receiving Operation

Here, operations performed when an AIS signal generated by the OXC device 14A is transmitted and is received by the transponder device 15A1 will be described with reference to a flowchart illustrated in FIG. 4.

Figure 4:
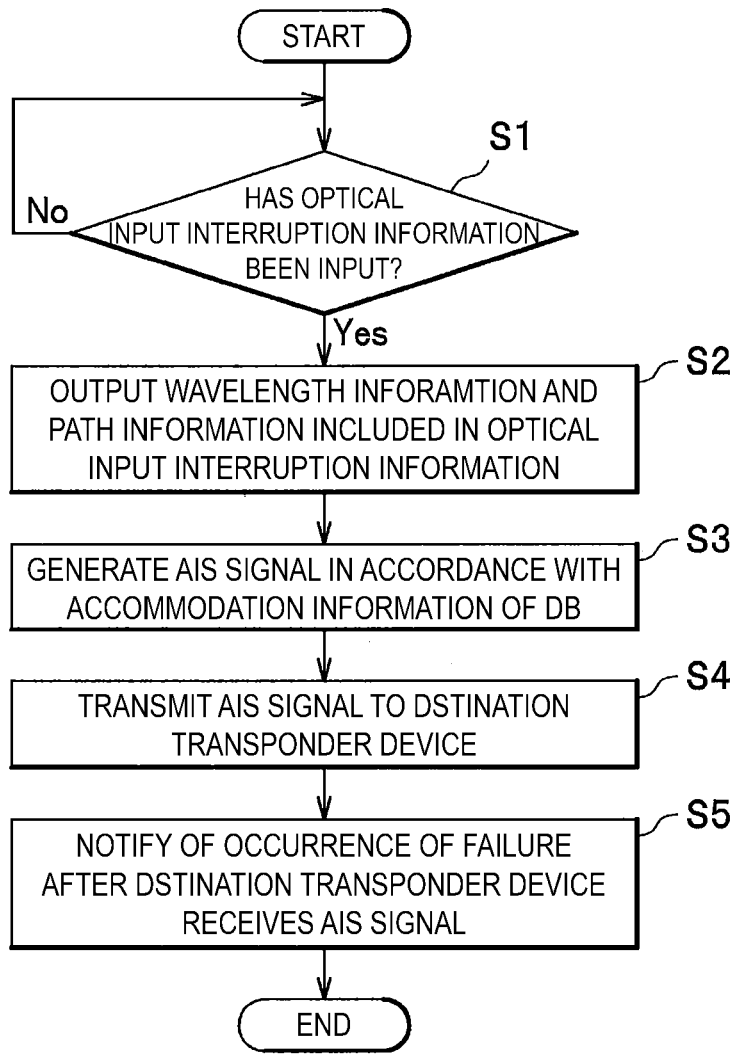
FIG. 4 is a flowchart illustrating transmission/reception operations of an AIS signal between the OXC device and the transponder device.

In step S1 illustrated in FIG. 4, the monitoring control part 4e1 of the OXC device 14a determines whether or not the optical input interruption information has been input from the OSC part 4d1. As a result, it is assumed that the optical input interruption information has been input, and the optical input interruption includes the wavelength information on the wavelengths λ1 and λ2 of optical signals in which the optical input interruption has occurred and the path information on the first path 16a of these optical signals.

In this case, in step S2, the monitoring control part 4e1 outputs both pieces of information on the wavelengths λ1 and λ2 of the optical signals and the first path 16a included in the optical input interruption information to the AIS generation part 4j.

In step S3, the AIS generation part 4j reads each piece of information on the DB 4ia of the accommodation information management part 4i in accordance with both the pieces of information described above and generates the AIS signal 31 in the predetermined format (FIG. 3). In this case, two AIS signals are generated.

For example, a first AIS signal is formed from information on a format of a packet header "H1", a transmitting device ID "14A", a destination device ID "TP1", a transponder ID "Ta1", a wavelength number "λ1", and an AIS alarm "failure".

For example, a second AIS signal is formed from information on a format of a packet header "H2", a transmitting device ID "14A", a destination device ID "TP1", a transponder ID "Ta2", a wavelength number "λ2", and an AIS alarm "failure".

In step S4, the two AIS signals generated in such a format are output from the AIS generator 4j and are converted from electrical signals to optical signals by the E/O conversion part 4k1 and then are transmitted from the optical coupler 4l1 to the transponder device 15A1 through the optical fiber 16.

In step S5, the two AIS signals that have been transmitted are converted from optical signals to electrical signals by the O/E conversion part 5k1 through the optical coupler 5l1 of the transponder device 15A1 and then are received by the AIS receiving part 5h1 and are input to the monitoring control part 5e1. The monitoring control part 5e1 notifies a monitoring device such as the EMS device 17 (see FIG. 9) of an occurrence of an external failure of the transponder device 15A1 in accordance with the two AIS signals.

Pre-registration Process for OXC Device DB

Figure 5:
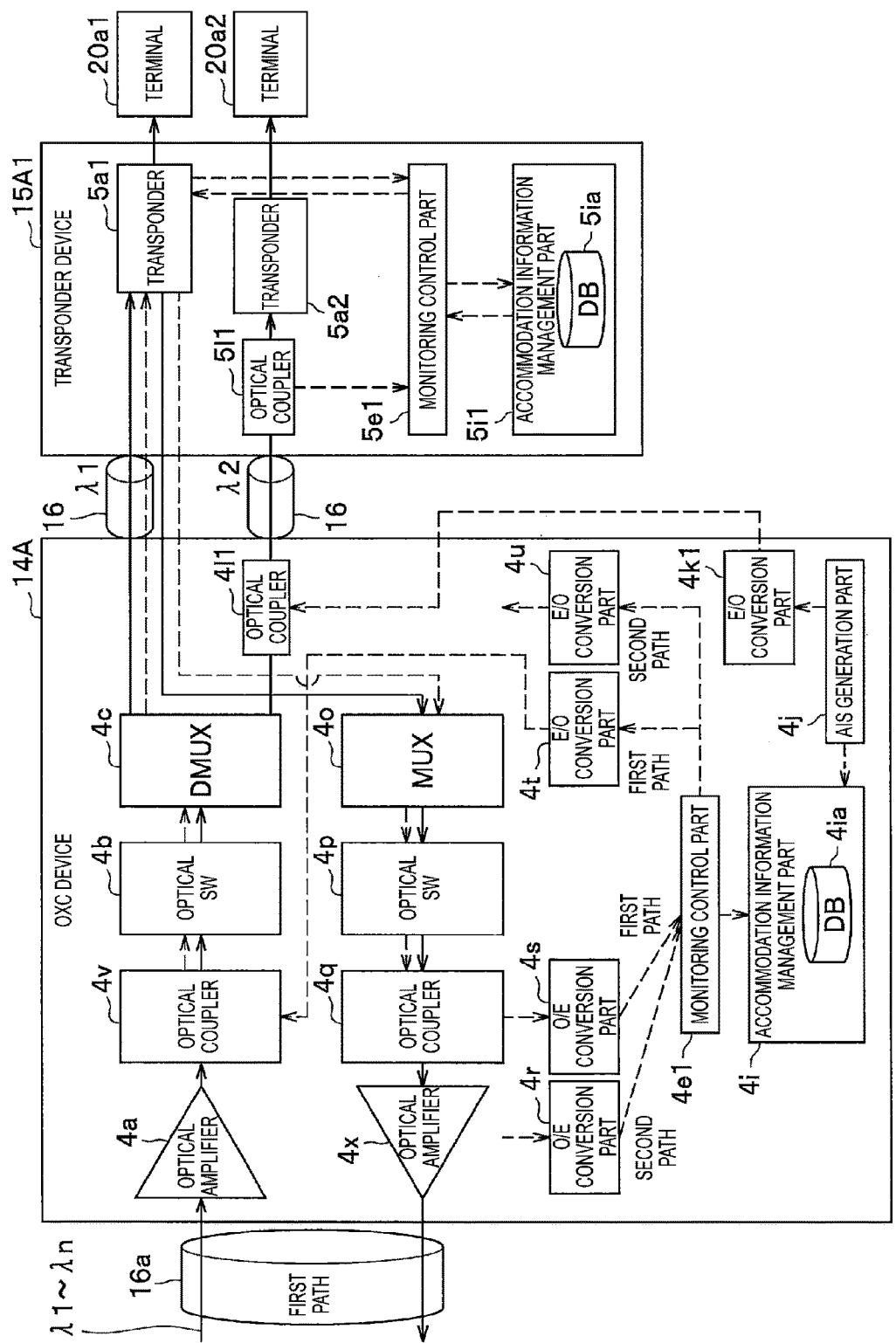
FIG. 5 is a block diagram illustrating a configuration of an OXC device and a transponder device for pre-registration of information in the DB of the OXC device.
Figure 6:
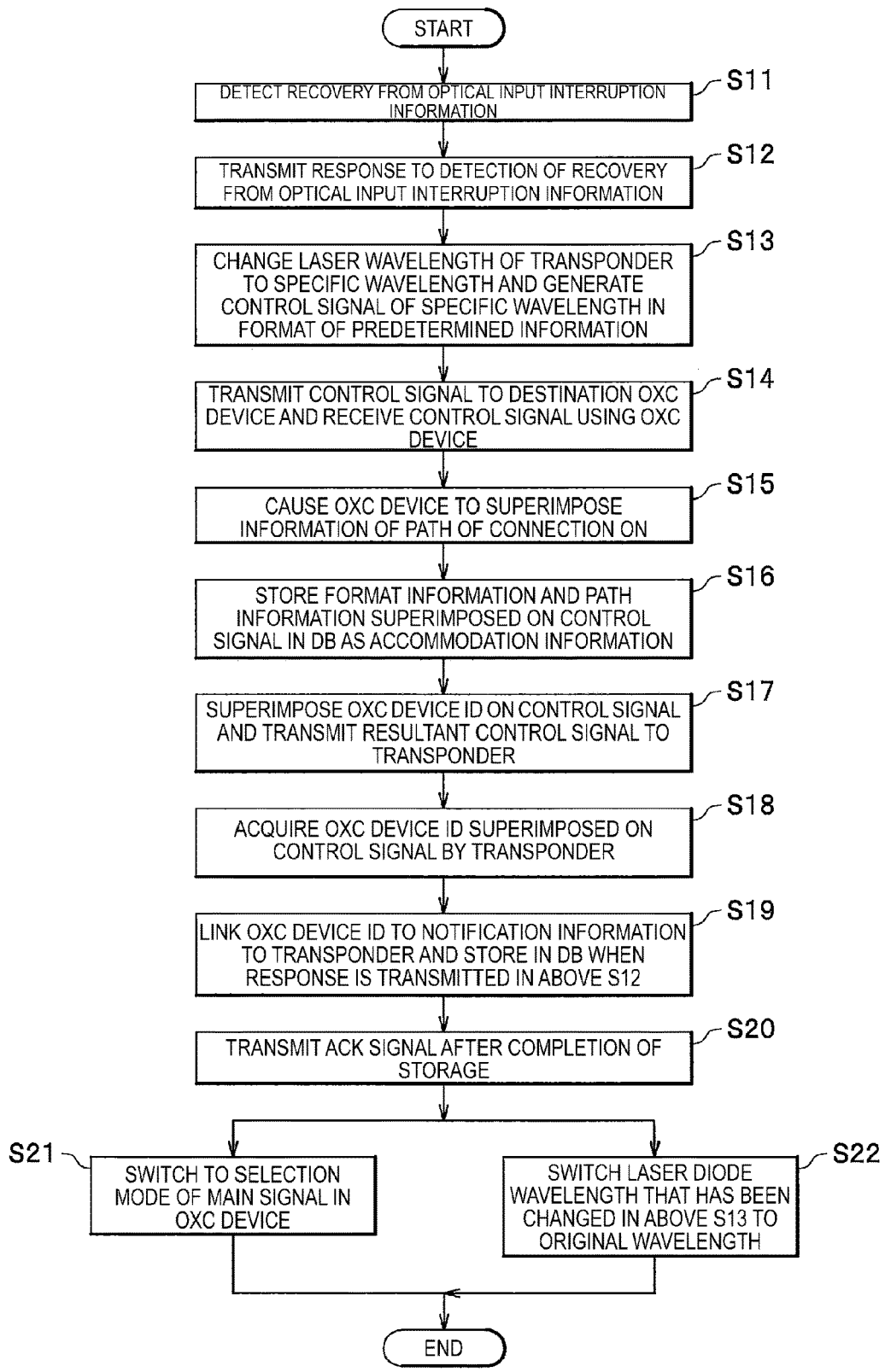
FIG. 6 is a flowchart illustrating a process of pre-registering information in the DB of the OXC device.

Next, a pre-registration process of accommodation information for the DB 4ia included in the accommodation information management part 4i of the OXC device 14A will be described with reference to FIGS. 5 and 6. FIG. 5 is a block diagram illustrating a configuration of the OXC device 14A and the transponder device 15A1 for a pre-registration process of accommodation information for the DB 4ia of the accommodation information management part 4i. FIG. 6 is a flowchart illustrating a process of pre-registering accommodation information in the DB 4ia.

An OXC device 14A illustrated in FIG. 5 includes a MUX 4o, an optical SW 4p, an optical coupler 4q, O/E conversion parts 4r and 4s, E/O conversion parts 4t and 4u, an optical coupler 4v, and an optical amplifier 4x in addition to the components of the OXC device 14A (FIG. 1) described above. In addition, a transponder device 15A1 includes an accommodation information management part 5i1 having a DB 5ia in addition to the components of the transponder device 15A1 (FIG. 1) described above.

The optical coupler 4v is connected between the optical amplifier 4a and DMUX 14c. The MUX 4o has an input end connected to the transponder 15a1 through an optical fiber 16 and an output end connected to the optical SW 4p. The optical SW 4p is connected to the optical amplifier 4x and the O/E conversion part 4s through the optical coupler 4q.

The O/E conversion part 4s and the O/E conversion part 4r are connected to an input end of the monitoring control part 4e1. The E/O conversion parts 4t and 4u are connected to an output end of the monitoring control part 4e1, and the E/O conversion part 4t is connected to the optical coupler 4v.

The basic operation of these components will be described. The MUX 4o multiplexes an optical signal from the transponder 15a1 with optical signals from other transponders not illustrated in the drawing and outputs a multiplexed optical signal to the optical coupler 4q through the optical SW 4p. The optical coupler 4q outputs the multiplexed optical signal to the first path 16a through the optical amplifier 4x and outputs the multiplexed optical signal to the monitoring control part 4e1 through the O/E conversion part 4s. The E/O conversion part 4t converts the electrical signal from the monitoring control part 4e1 into an optical signal and outputs the converted optical signal to the optical coupler 4v, and the optical coupler 4v outputs the optical signal to the optical SW 4b.

In the transponder device 15A1, similar to the DB 4ia illustrated in FIG. 2, the DB 5ia of the accommodation information management part 5i1 stores each piece of information on a channel number, a path number, an accommodation wavelength, a destination device ID, and a transponder ID.

Pre-registration Operation

Next, a pre-registration process of accommodation information for the DB 4ia of the OXC device 14A will be described with reference to a flowchart of FIG. 6. This pre-registration process starts when the OXC device 14A and the transponder device 15A1 are connected for the first time.

In step S11 illustrated in FIG. 6, when an input of a main signal, which is an optical signal of the wavelength λ1 from the OXC device 14A, is detected, the transponder 5a1 of the transponder device 15A1 determines that the optical input interruption is recovered, and this recovery information is output to the monitoring control part 5e1.

The recovery determination function of the optical input interruption of the transponder 15a1 described above operates when optical input interruption under monitoring is recovered, and operates also when the OXC device 14A and the transponder device 15A1 are connected for the first time. The OXC device 14A and the transponder device 15A1 are unconnected before this first connection, and thus, the transponder device 15A1 is in a state in which optical input interruption is detected. For this reason, when the transponder 15a1 or 15a2 (the transponder device 15A1) is connected to the OXC device 14A for the first time, and an optical signal is transmitted, the transponder determines recovery from the optical input interruption.

In step S12, when information on the optical input interruption recovery is input, the monitoring control part 5e1 detects this recovery and returns this response to the transponder 15a1. When returning the response, the monitoring control part 5e1 notifies the transponder 15a1 of each piece of information on the channel number, the path number, the accommodation wavelength, the destination device ID (for example, the ID of the OXC device 14A), and the transponder ID that have been stored in the DB 5ia of the accommodation information management part 5i1.

In step S13, the transponder 15a1 that has received the response of step S12 described above changes the wavelength of a laser (laser wavelength), which is not illustrated, mounted in the transponder 15a1 to a unique specific wavelength (for example, λc). Thereafter, the transponder 15a1 generates a control signal that is an optical signal of the specific wavelength λc using the laser. At the time of this generation, the transponder 15a1 superimposes format information on the packet header, the transmitting device ID, the destination device ID (the ID of the OXC device 14A), the transponder ID, the wavelength number, and the like illustrated in FIG. 7 on a control signal used for performing pre-registration in accordance with the information on the DB 5ia notified from the monitoring control part 5e1.

In step S14, the transponder 15a1 transmits the control signal on which the format information is superimposed to the OXC device 14A of the destination. The OXC device 14A receives the control signal and inputs the control signal to the optical coupler 4q through the MUX 4o and the optical SW 4p. The optical coupler 4q separates the control signal and an optical signal other than an optical signal of the specific wavelength λc of the control signal from each other and outputs only the control signal to the monitoring control part 4e1.

In step S15, the monitoring control part 4e1 superimposes path information (path information such as the first path 16a, the second path 16b, and the like) according to the optical fiber 16 connected to the OXC device 14A on the input control signal and inputs a resultant signal to the accommodation information management part 4i.

In step S16, as illustrated in FIG. 2, the accommodation information management part 4i writes and stores (registers) the format information and the path information superimposed on the control signal into corresponding fields of the DB4ia as accommodation information.

In step S17, the monitoring control part 4e1 superimposes the ID of the OXC device 14A (the OXC device ID) on the control signal of the specific wavelength λc and transmits a resultant signal to the transponder 15a1 through E/O conversion part 4t, the optical coupler 4v, the optical SW b, and the DMUX 4c.

In step S18, in a case where the received signal is a control signal of the specific wavelength λc, the transponder 15a1 outputs the OXC device ID superimposed on the control signal to the monitoring control part 5e1.

In step S19, the monitoring control part 5e1 outputs the input OXC device ID to the accommodation information management part 5i1. The accommodation information management part 5i1 links the OXC device ID to each piece of information notified to the transponder 15a1 at the time of response in Step S12 and store the information in DB5ia.

In step S20, when the storage is completed, the monitoring control part 5e1 sends an ACK signal, which is a response signal, to the OXC device 14A. After this transmission, the subsequent steps S21 and S22 are processed in parallel, and the pre-registration operation ends after these processes.

In other words, in step S21, when an ACK signal is received through the MUX 4o and the optical SW4p, the OXC device 14A switches the optical SW4p to a selection mode of an optical signal that is a main signal.

In step S22, the transponder 15a1 switches the laser wavelength (the specific wavelength λc), which has been changed in step S13 described above, to a wavelength for the main signal before change.

Effects of Embodiment

Effects of the optical transmission system 10A according to this embodiment will be described. This optical transmission system 10A connects, using an optical fiber 16, and aggregates a plurality of OXC devices 14A using an optical fiber 16 which switches wavelength paths of optical signals between transponder devices (for example, the transponder device 15A1) that relays optical signals transmitted to and from the terminals 19a and 19b as communication devices.

Next, features of the configuration of this embodiment will be described.

(1) The OXC device 14A is provided with a first control part including both an OSC part 4d1 and a monitoring control unit 4e1. The OSC part 4d1, when the optical input interruption in which an optical signal input from the optical fiber 16 is interrupted is detected, outputs wavelength information indicating a wavelength of an optical signal in which optical input interruption has occurred and path information on a path of the optical fiber 16 in which the optical input interruption has occurred. In addition, the OXC device 14A includes an AIS generation part 4j. The AIS generation part 4j generates an AIS signal (alarm signal) including both pieces of information on the wavelength and the path of the optical signal relating to the optical input interruption and alarm information relating to both the pieces of information, in accordance with the wavelength information and the path information that have been output from the first control part.

The transponder device 15A1 is provided with a second control part including an AIS receiving part 5h1 and a monitoring control part 5e1. The AIS receiving part 5h1 notifies an external failure on an upstream side of the transponder device 15A1 based on both information and alarm information included in the above-described generated AIS signal.

According to this configuration, in the OXC device 14A, an AIS signal is generated, and this AIS signal is notified to the transponder device 15A1 from the OXC device 14A. The AIS signal includes information on the wavelength of the optical signal according to the optical input interruption from the optical fiber 16 and information on the path of the optical fiber 16 through which the optical signal is transmitted and alarm information relating to the both pieces of information. The transponder device 15A1 can detect an external failure on an upstream side of the transponder device 15A1 based on the both pieces of information and the alarm information included in the notified AIS signal. For this reason, it is possible to appropriately determine in the transponder device 15A1 connected to the OXC device 14A using the optical fiber 16 whether the optical input interruption detected by the OXC device 14A is due to an external failure from the upstream side or an internal failure.

(2) The optical couplers 4I1 and 5I1 are inserted into the optical fiber 16 connecting the OXC device 14A and the transponder device 15A1, and the AIS signal generated by the AIS generation part 4j is transmitted from the OXC device 14A1 to the transponder device 15A1 through the optical couplers 4I1 and 5I1.

According to this configuration, an AIS signal can be transmitted to the transponder device 15A1 through the optical couplers 4I1 and 5I1 using an existing optical fiber 16 connecting the OXC device 14A and the transponder device 15A1. For this reason, a high-cost configuration is not necessary, in which an AIS signal is transmitted by cable-connecting the OXC device 14A and the transponder device 15A1 using a LAN cable or the like other than the optical fiber 16. In other words, a configuration in which the transponder device 15A1 can appropriately determine whether optical input interruption of the OXC device 14A is due to an external failure or an internal failure can be realized at low cost.

(3) The transponder device 15A1 includes a DB5ia storing each piece of information on a path number that is a number of a path of the optical fiber 16, an accommodation wavelength that is a wavelength of an optical signal accommodated in the path, device IDs that are a transmitting device ID and a destination device ID of the signal, and a transponder ID. The OXC device 14A includes a DB 4ia in which each piece of information stored in the DB 5ia is registered and stored. The transponder device 15A1 determines recovery from the optical input interruption at the time of transition from a state of being unconnected from the OXC device 14A to a connected state through the optical fiber 16 and, after this determination, superimposes each piece of information read from the DB 5ia on a control signal that has been changed to a unique specific wavelength, and transmits a resultant control signal to the OXC device 14A. The OXC device 14A receives the control signal that has been transmitted and registers and stores each piece of information superimposed on the received control signal in the DB 4ia in accordance with control of the second control part.

According to this configuration, when the OXC device 14A is connected to the transponder device 15A1 for the first time, each piece of information on the accommodation wavelength, the device ID, and the transponder ID stored in the DB 5ia of the transponder device 15A1 can be registered and stored in the DB 4ia of the OXC device 14A. After the storage, the occurrence of an external failure relating to optical input interruption of the OXC device 14A can be notified to the transponder device 15A1 using each piece of information stored in the DB 4ia.

In addition, a specific configuration can be appropriately changed without departing from the gist of the present invention.

REFERENCE SIGNS LIST

10A Optical transmission system
14A OXC device
4a, 4x Optical amplifier 4b, 4p Optical SW
4c DMUX
4d1 OSC part
4e1 Monitoring control part
4j Accommodation information management part
4j AIS generation part
4k1, 4kn, 4t, 4u E/O conversion part
4r, 4s O/E conversion part
4l1, 4ln, 4q, 4v Optical coupler
4ia DB
4o MUX
15A1, 15An Transponder device
5a1, 5a2, 5n1, 5n2 Transponder
5l1, 5ln Optical coupler
5k1, 5kn O/E Conversion part
5h1, 5hn AIS receiving part
5e1, 5en Monitoring control part
5i1, 5in Accommodation information management part
5ia DB
16 Optical fiber cable
16a First path
16b Second path
20a1, 20a2, 20an, 20an Terminal

The invention claimed is:

1. An optical transmission system configured to connect, using an optical transmission line, and aggregate a plurality of optical cross connect (OXC) devices that switches wavelength paths of optical signals between a plurality of transponder devices that relay optical signals transmitted to and from a communication device,
wherein an OXC device of the plurality of OXC devices includes:
a first control part, when optical input interruption in which an optical signal input from the optical transmission line is interrupted is detected, configured to output wavelength information indicating a wavelength of the optical signal in which the optical input interruption has occurred, and path information on a path of the optical transmission line in which the optical input interruption has occurred;
a generation part configured to generate an alarm signal in accordance with the output wavelength information and the output path information from the first control part, the alarm signal including both pieces of information on the wavelength and the path of the optical signal relating to the optical input interruption and alarm information relating to the both pieces of information; and
a first database (DB);
and wherein a transponder device of the plurality of transponder devices includes:
a second DB storing information on a path number that is a number of a path of the optical transmission line, information on an accommodation wavelength that is a wavelength of an optical signal accommodated in the path, information on device identifications (IDs) that are unique information of a transmitting device and a destination device of a signal, and information on a transponder ID, and wherein each piece of information stored in the second DB of the transponder device is registered and stored in the first DB of the OXC device; and
a second control part configured to notify of an external failure of the transponder device based on the both pieces of information and the alarm information included in the generated alarm signal;
the transponder device is configured to:
determine recovery from the optical input interruption when a state is changed from a state of being unconnected to the OXC device to a state of being connected to the OXC device through the optical transmission line,
after this determination, superimpose each piece of the information read from the second DB on a control signal that has been changed to have a unique specific wavelength, and
transmit a resultant control signal to the OXC device; and
the OXC device is configured to:
receive the transmitted control signal,
register the received control signal, and
store the information superimposed on the received control signal in the first DB in accordance with control of the second control part.

2. The optical transmission system according to claim 1, comprising:
an optical coupler disposed in an optical transmission line coupling the OXC device and the transponder device, and
the OXC device is configured to transmit the generated alarm signal to the transponder device through the optical coupler.

3. An optical transmission method of an optical transmission system that is configured to connect, using an optical transmission line, and aggregate a plurality of optical cross connect (OXC) devices that switches wavelength paths of optical signals between a plurality of transponder devices that relay optical signals transmitted to and from a communication device, the optical transmission method comprising:
when optical input interruption in which an optical signal input from the optical transmission line is interrupted is detected, outputting, by an OXC device, wavelength information indicating a wavelength of the optical signal in which the optical input interruption has occurred, and path information on a path of the optical transmission line in which the optical input interruption has occurred, wherein the OXC device includes a first DB in which each piece of information stored in a second DB of one of the plurality of transponder devices is registered and stored, and
generating, by the OXC device, an alarm signal in accordance with the output wavelength information and the output path information, the alarm signal including both pieces of information on the wavelength and the path of the optical signal relating to the optical input interruption and alarm information relating to the both pieces of information; and
notifying, by a transponder device of the plurality of transponder devices, of an external failure of the transponder device based on the both pieces of information and the alarm information included in the generated alarm signal, wherein the transponder device includes the second DB storing information on a path number that is a number of a path of the optical transmission line, information on an accommodation wavelength that is a wavelength of an optical signal accommodated in the path, information on device identifications (IDs) that are unique information of a transmitting device and a destination device of a signal, and information on a transponder ID;
determining, by the transponder device, recovery from the optical input interruption when a state is changed from a state of being unconnected to the OXC device to a state of being connected to the OXC device through the optical transmission line;

after this determination, superimposing, by the transponder device, each piece of the information read from the second DB on a control signal that has been changed to have a unique specific wavelength;

transmitting, by the transponder device, a resultant control signal to the OXC device;

receiving, by the OXC device, the transmitted control signal;

registering, by the OXC device, the received control signal; and storing, by the OXC device, the information superimposed on the received control signal in the first DB in accordance with control of the second control part.

4. The optical transmission method according to claim 3, wherein an optical coupler is inserted into an optical transmission line coupling the OXC device and the transponder device, and transmitting, by the OXC device, the generated alarm signal to the transponder device through the optical coupler.

* * * * *